United States Patent
Ando

(10) Patent No.: US 7,313,173 B2
(45) Date of Patent: Dec. 25, 2007

(54) CORRELATION DETECTION METHOD AND APPARATUS, TRANSMISSION DIVERSITY DETECTION METHOD AND APPARATUS, EACH METHOD AND APPARATUS FOR DETECTION WITHIN A SMALL TIME UNIT

(75) Inventor: Kimiaki Ando, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 759 days.

(21) Appl. No.: 10/312,583

(22) PCT Filed: Apr. 4, 2002

(86) PCT No.: PCT/JP02/03372

§ 371 (c)(1),
(2), (4) Date: Jan. 16, 2003

(65) Prior Publication Data

US 2004/0008758 A1    Jan. 15, 2004

(30) Foreign Application Priority Data

Apr. 5, 2001    (JP) .............................. 2001-107192

(51) Int. Cl.
*H03D 1/00* (2006.01)
*H04B 1/00* (2006.01)
*H04L 7/00* (2006.01)

(52) U.S. Cl. ...................... 375/149; 375/148; 375/367; 375/343

(58) Field of Classification Search ........ 375/148–150, 375/152, 367, 343; 708/422
See application file for complete search history.

(56) References Cited

U.S. PATENT DOCUMENTS

| | | | | |
|---|---|---|---|---|
| 4,759,034 A | * | 7/1988 | Nagazumi | .................. 375/142 |
| 5,315,616 A | * | 5/1994 | DeLisle et al. | .............. 375/150 |
| 5,960,028 A | * | 9/1999 | Okamoto et al. | ........... 375/130 |
| 6,154,487 A | | 11/2000 | Murai et al. | |
| 6,205,167 B1 | * | 3/2001 | Kamgar et al. | .............. 375/134 |
| 6,493,334 B1 | * | 12/2002 | Krzymien et al. | .......... 370/342 |
| 6,650,689 B1 | * | 11/2003 | Oishi et al. | .................. 375/142 |
| 2002/0051486 A1 | * | 5/2002 | Aue | ........................... 375/150 |

(Continued)

FOREIGN PATENT DOCUMENTS

GB    2340002    2/2000

(Continued)

OTHER PUBLICATIONS

English Language Abstract of JP 2000-36775.

(Continued)

*Primary Examiner*—David C. Payne
*Assistant Examiner*—Aslan Ettehadieh
(74) *Attorney, Agent, or Firm*—Greenblum & Bernstein, P.L.C.

(57) ABSTRACT

One code is generated by combining (including addition) 2 or more codes, correlation detection method which detects the correlation by multiplying such a generated code by the reception data. In communication system based on W-CDMA method, first spreading code ($a \cdot Cp$) obtained by multiplying primary synchronization code with a predetermined coefficient and second spreading code ($a \cdot Cs$) obtained by multiplying secondary synchronization code with a predetermined coefficient are added. Then, the third spreading code ($a \cdot Cp + a \cdot Cs$) obtained from such an addition is multiplied by the reception data, and correlation value is obtained after integrating the multiplication results. Thus, it is determined whether the reception data has been subjected to STTD diversity.

3 Claims, 16 Drawing Sheets

U.S. PATENT DOCUMENTS

2002/0057729 A1* 5/2002 Farbod et al. .............. 375/150

FOREIGN PATENT DOCUMENTS

| JP | 9-18386 |   | 1/1997 |
|----|---------|---|--------|
| JP | 11-41141 |   | 2/1999 |
| JP | 11-041141 | * | 2/1999 |
| JP | 2000-36775 |   | 2/2000 |
| JP | 2000-315965 |   | 11/2000 |
| JP | 2001-69033 |   | 3/2001 |

OTHER PUBLICATIONS

English Language Abstract of JP 9-18386.
English Language Abstract of JP 2000-315965.
English Language Abstract of JP 11-41141.
English Language Abstract of JP 2001-69033.
Article published by 3GPP TS 25.211 V3.6.0 (Mar. 2001) Technical Specification, entitled 3rd Generation Partnership Project; Technical Specification Group Radio Access Network; Physical channels and mapping of transport channels onto physical channels (FDD) (Release 1999).

* cited by examiner

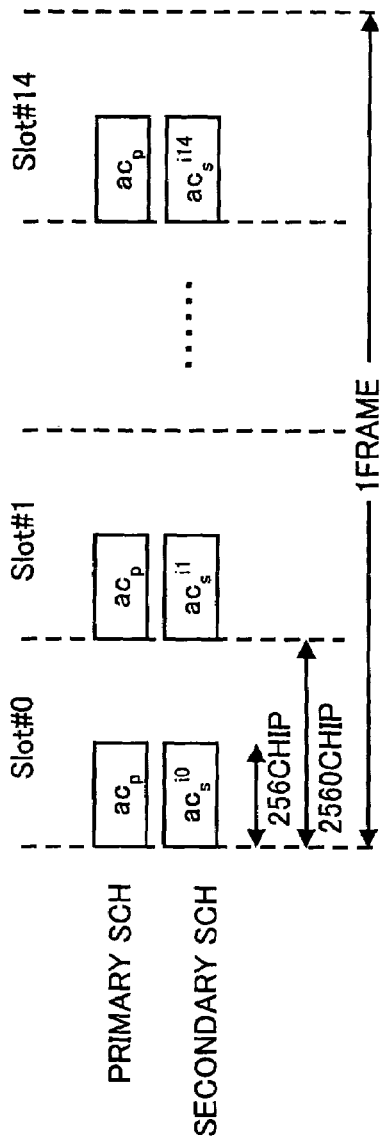
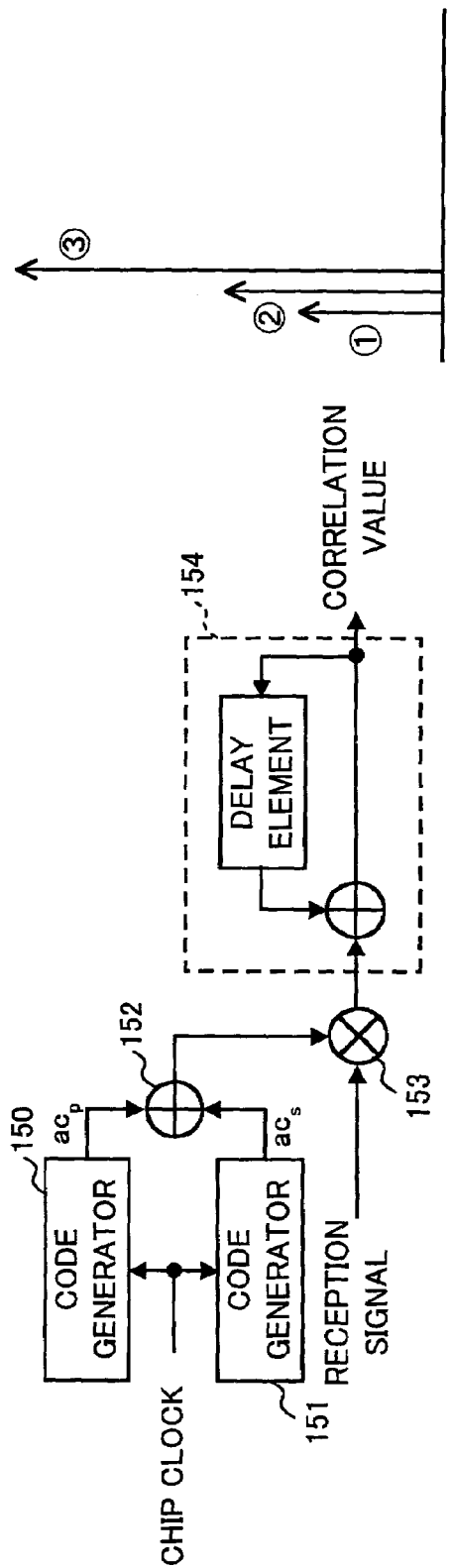
FIG.13A
FIG.13B
FIG.13C

CORRELATION DETECTION METHOD AND APPARATUS, TRANSMISSION DIVERSITY DETECTION METHOD AND APPARATUS, EACH METHOD AND APPARATUS FOR DETECTION WITHIN A SMALL TIME UNIT

TECHNICAL FIELD

The present invention relates to correlation detection method in CDMA communication, correlation detection apparatus, method of detection the presence of transmission diversity using synchronization code, and transmission diversity detection circuit.

BACKGROUND ART

In CDMA communication, the reception signal is multiplied by spreading code, and the correlation value is obtained after integrating the multiplication results.

In the circuit where it is necessary to carry out correlation detection in a small period of time comparing to a time corresponding to 1 chip (for example, DLL: Delay Locked Loop), there are problems that a circuit configuration becomes complicated, circuit scale becomes large, and power consumption increases with increasing of processing speed.

In addition, there is a case in which transmission side apparatus notifies reception side apparatus whether special processing are carried out or not using a special code. For example, in W-CDMA method applied to IMT2000, the transmission side apparatus notifies reception side apparatus whether STTD transmission diversity processing is carried out or not using synchronization code.

However, an appropriate correlation detection cannot be carried out in the reception side under bad reception environment, and reception side apparatus cannot determine whether the reception signal includes a signal subjected to transmission diversity processing or not.

DISCLOSURE OF INVENTION

A first object of the present invention is to carry out correlation detection within a small time unit comparing to the time corresponding to 1 chip while preventing the increase of power consumption or circuit complexity.

Still another object of the present invention is to improve the detection precision when the reception side apparatus detects whether the reception signal includes a signal subjected to STTD transmission diversity processing using a synchronization code while preventing the increase of power consumption or circuit complexity.

In correlation detection method of the present invention, more than two spreading codes are combined, and spreading code of the offset that is smaller than chip interval is generated. Then, the combined spreading code is multiplied by a fixed reception signal, and the correlation value at desired timing is calculated.

Spreading code combining is performed easily using an uncomplicated circuit. Since correlation detection circuit operates within chip clock, the problem of power consumption increasing does not occur.

Furthermore, in transmission diversity detection method of the present invention, it is detected whether an STTD (Space Time block coding based Transmit antenna Diversity) transmission diversity processing is applied or not in the reception signal using a primary synchronization channel (primary SCH) and secondary synchronization channel (secondary SCH).

In addition, even if correlation detection is related to either primary SCH or secondary SCH, the spreading code corresponding to primary SCH and spreading code corresponding to secondary SCH are added. Thus, a combined spreading code is generated, and correlation detection is carried out using such a combined spreading code.

Hence, the precision of (S/N) of the correlation detection which is used for determining the presence of STTD transmission diversity is improved.

BRIEF DESCRIPTION OF DRAWINGS

FIG. 13A is a diagram showing a configuration of synchronization channels;

FIG. 13B is a block diagram showing an exemplary configuration of a circuit (transmission diversity detection circuit) of the present invention, carrying out correlation detection of synchronization channels;

FIG. 13C is an illustration graph to explain the addition of correlation values;

BEST MODE FOR CARRYING OUT THE INVENTION

Hereafter, embodiments of the present invention will be described with reference to the accompanying drawings.

Embodiment 1

Figure 1:
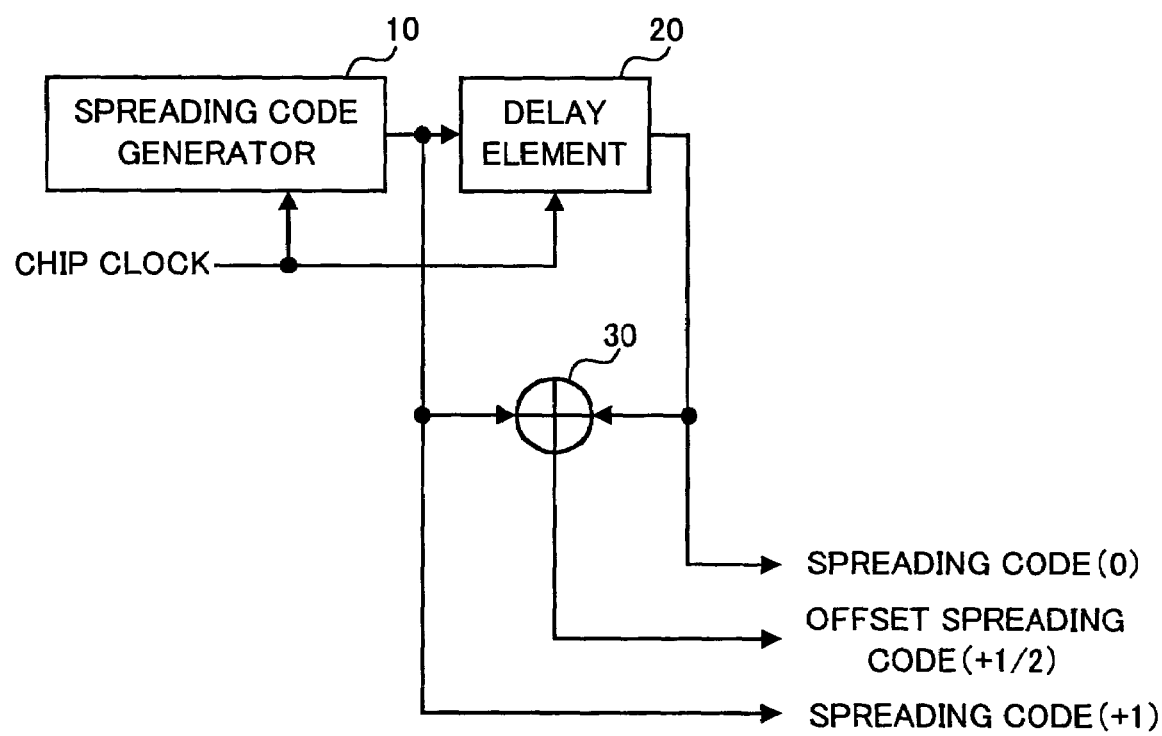
FIG. 1 is a block diagram showing an exemplary configuration of the main part (spreading code generator) of correlation detection apparatus of the present invention.

FIG. 1 is a block diagram showing a configuration of the main part (spreading code generator) of correlation detection apparatus according to claim 1 of the present invention.

As shown in the figure, spreading code generator 10 generates a spreading code in synchronous with chip clock.

The spreading code is divided into two sequences, one is given delay corresponding to 1 chip by delay section 20, and the other is just the output without delay.

Delayed spreading code and non-delayed spreading code are inputted into operation section (logical circuit and combiner) 30. Operator 30 performs interpolation process (combining process), and generates the spreading code which has offset smaller than chip time interval (for instance, ½ chip).

Figure 2:
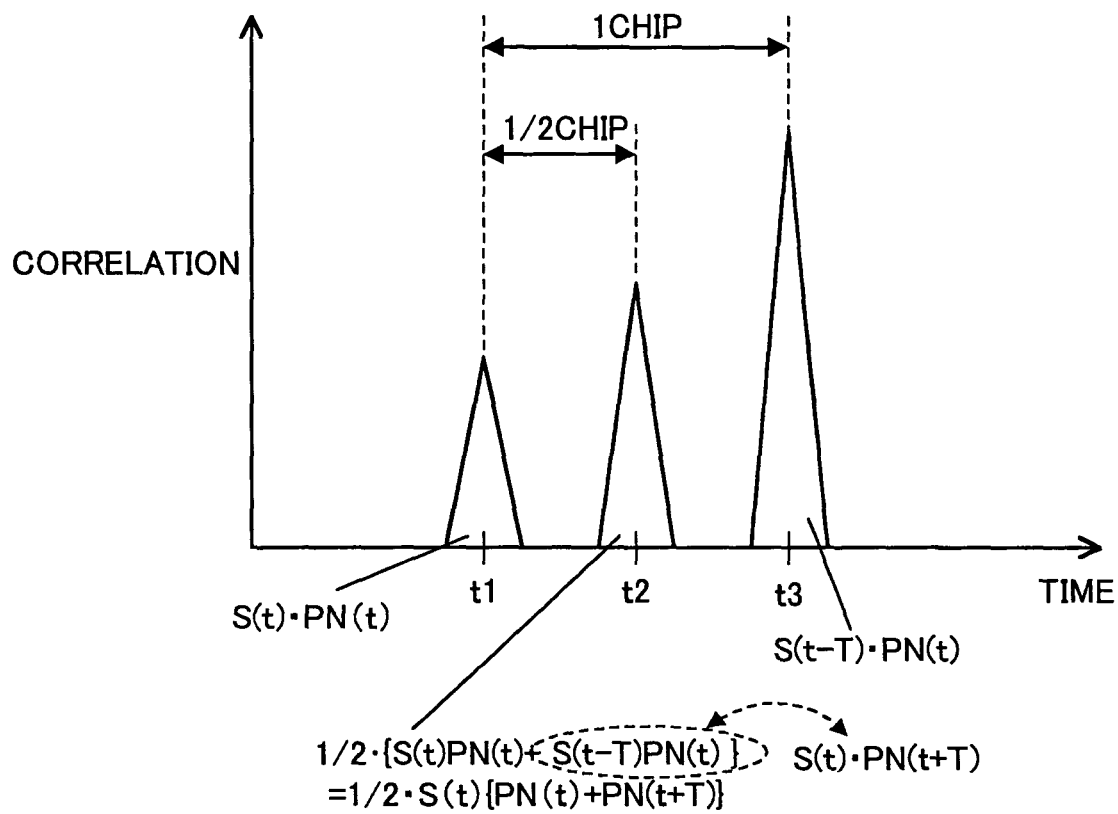
FIG. 2 is a graph explaining the principle of spreading codes combining in the circuit shown in FIG. 1.

FIG. 2 is a graph showing the principle of interpolation process (combining process) of the spreading code generated in the circuit of FIG. 1.

Correlation value of the CDMA reception signal is obtained by multiplying reception signal s(t) by spreading code PN(t).

In FIG. 2, the time t1 is set as reference, and only the interval of a 1 chip time-spaced is considered, here, it is assumed t3. Time t2 is the middle point between t1 and t3 (offset time of only ½ chip).

Correlation value at time t1 is the correlation value S(t)PN(t), and correlation value at time t3 is the correlation value S(t−T)PN(t). Correlation value at time t2 is estimated from the correlation values at time t1 and time t3.

Although there are various ways of estimation, but here the simplest one is considered, the correlation value at time t2 is obtained by averaging the two correlation values.

Thus, the correlation value at time t2 is given by the following linear expression $$\tfrac{1}{2} \cdot \{S(t)PN(t) + S(t-T)PN(t)\}.$$

Let S(t−T)PN(t)=S(t)PN(t+T), then, the aforementioned expression is written now as shown in expression (1) given below $$\tfrac{1}{2} \cdot S(t) \cdot \{PN(t) + PN(t+T)\} \qquad (1).$$

That is, adding the multiplication result obtained after multiplying the spreading code is equivalent to adding the spreading codes, then multiplying the spreading code obtained after such addition.

In the present embodiment, the reception signal is made constant, spreading code is obtained by linear computation (linear interpolation), and the obtained spreading code is multiplied by the reception signal.

Thus, the spreading code is generated by interpolation process (combining process), the precision of the technique after obtaining correlation value is improved so that correlation function among correlation values of the basic two codes (or more than 2) is strong.

In CDMA, the signal is subjected to QPSK (4-phase modulation). Thus, the phase of reception signal can be represented by vectors after carrying out mapping on the phase-plane (plane to show the phase by the coordinates I-axis and Q-axis). Therefore, the correlation value obtained after multiplying by the spreading code, similarly, can also be represented by vector.

Figures 3A, 3B:
FIG. 3A is an illustration graph to explain the estimation of correlation values.
FIG. 3B is an illustration graph to explain the addition of correlation values.

As shown in FIG. 3A, when the correlation of vector ① and ② of the correlation value is strong, both are combined and vector ③ can be generated. Thus, the reliability degree of the combined vector ③ becomes very large.

However, the reliability degree of the combined vector becomes low when correlation between correlation value vector ① and correlation value vector ② which is spaced by only 1 chip is low. For example, when the phase from the middle of the reception signal is deteriorated by influence of fading and when sampling the data which is before/after the time of such deterioration, there is a case that vectors ① and ② may be obtained in opposite directions. In such a case, the combined vector ③ of the correlation value becomes almost zero, and the reliability becomes extremely low.

Therefore, it is desirable to adopt a simple interpolation calculation while permitting an error of certain degree when performing interpolation of the correlation value.

The combination of spreading codes in correlation detection using synchronization code is shown in FIG. 3B which will be explained in Embodiment 5.

In such a case, it is not necessary to estimate the correlation value since vectors ① and ② of correlation value are of the same time point and oriented towards the same direction. Simply, the correlation value ③ is obtained by adding vectors ① and ② of the correlation value.

The detection reliability of the obtained correlation value does not deteriorate, and in this case, the S/N of correlation detection can be improved by combining spreading codes. Later, this point will be explained specifically.

Figure 4:
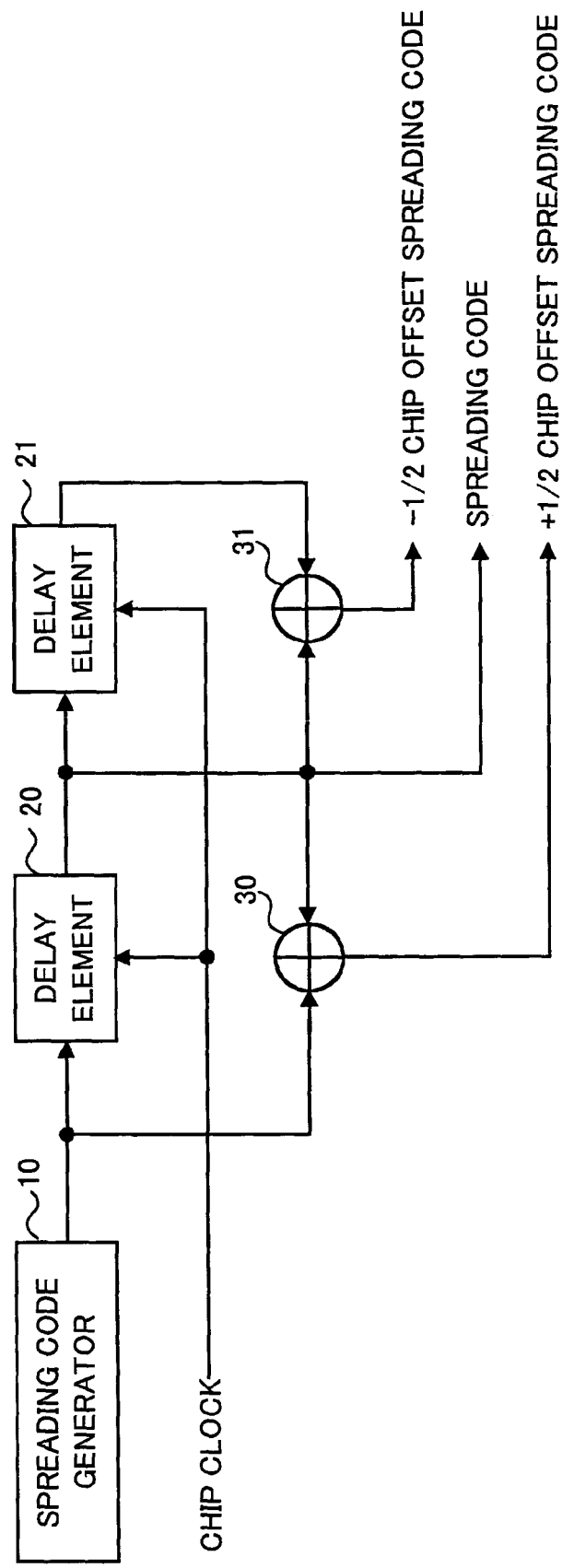
FIG. 4 is a block diagram showing an exemplary configuration of the main part (spreading code generator) of correlation detection apparatus of the present invention.

The circuit shown in FIG. 4 has the configuration similar to the circuit shown in FIG. 1 added by extra delay element and adder.

As shown in FIG. 4, this circuit has spreading code generator 10, delay elements 20 and 21, and adders 30 and 31 to add spreading codes next to each other outputted from delay elements.

Spreading code is generated by logical operation "1" or "0" in a normal digital circuit. These values are mapped into "±1" in multiplier when performing despreading process.

Adding a code which is delayed only by 1 chip clock means adding chips next to each other.

When the chips next to each other are +1 and +1, then the addition result becomes "+2". When +1 and −1, the addition result becomes "0", and when −1 and −1, the addition result becomes "−2". If normalization is to be carried out, the addition result becomes 3 values, "±1" and "0".

Figure 5:
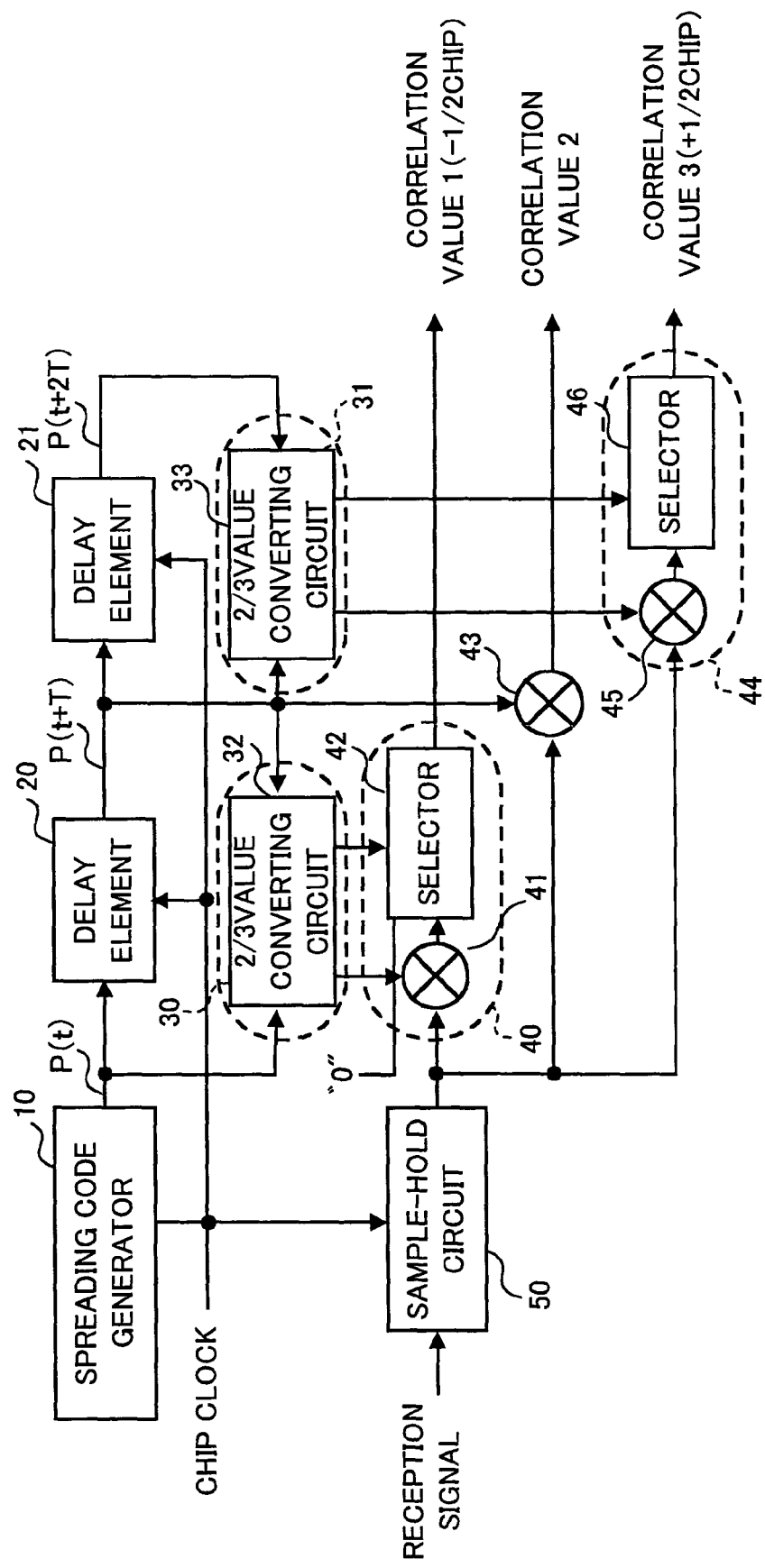
FIG. 5 is a block diagram showing an exemplary configuration of a correlation detection apparatus of the present invention.

Such an operation can be realized using a simple decoding circuit. The circuit of FIG. 5 shows in more details the configuration of the circuit shown in FIG. 4.

The ⅔ value converting circuit (decoder) 32, 33 generates spreading code chip corresponding to data combination between neighboring spreading code chips.

A chip data outputted from ⅔ value converting circuit (decoder) 32, 33 is multiplied by the reception signal that is hold in sample-hold circuit 50.

Multipliers 40 and 44 comprise multiplication circuit 41 and 45 and selector 42 and 46, respectively.

Figure 6:
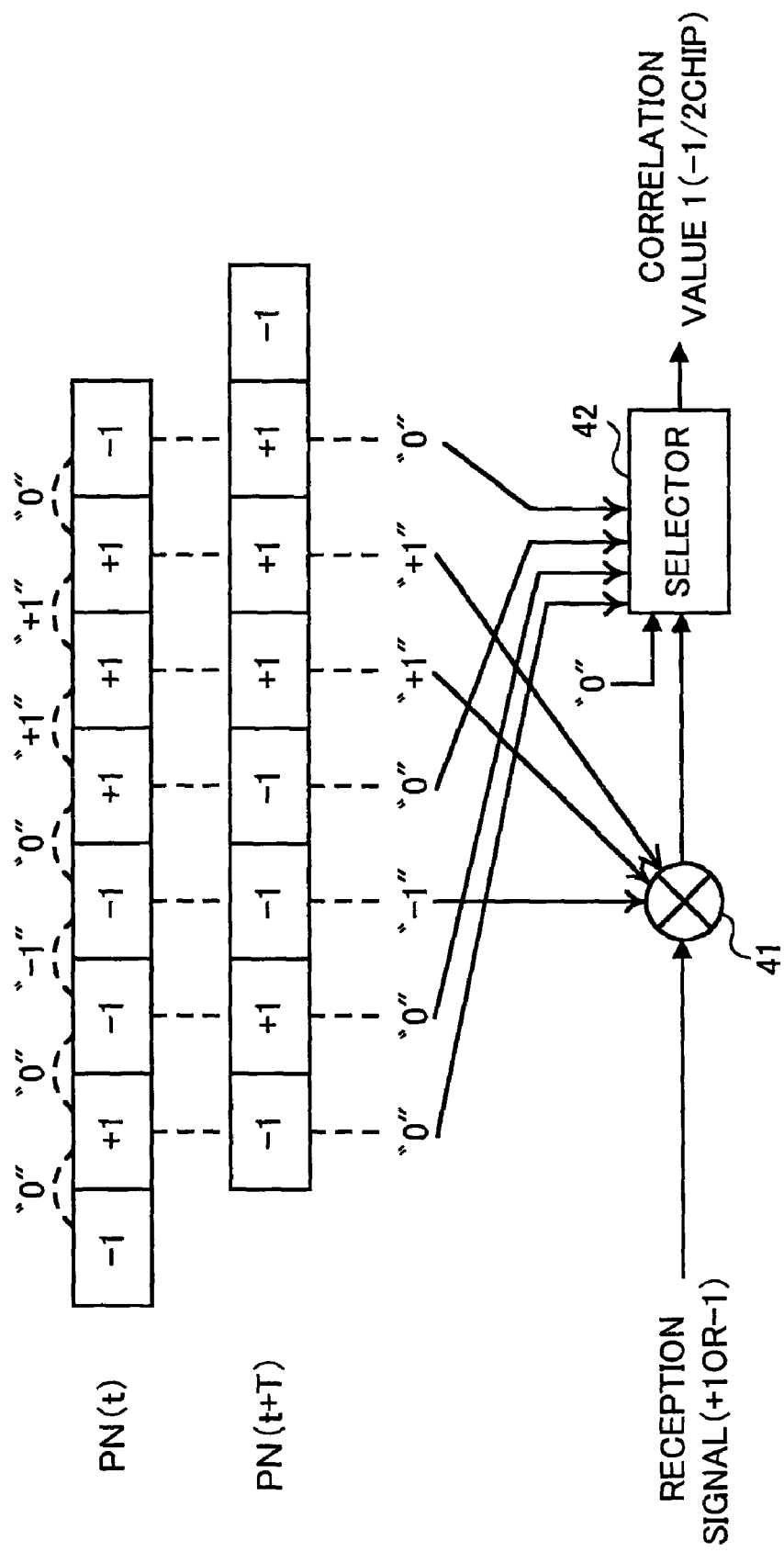
FIG. 6 is an illustration diagram to explain the operation of a ⅔ value converting circuit and a multiplier in an example of the correlation detection apparatus of the present invention.

Operation in multiplier 40 to support computation of ⅔ value converting circuit (decoder) 32 is shown in FIG. 6.

Both spreading code PN(t) shown in the upper side of FIG. 6 and a 1 chip delayed spreading code PN(t+T) are inputted into ⅔ value converting circuit 32.

The ⅔ value converting circuit 32 determines the two inputted combination (actually, the data of two neighboring chips) as described above, outputs "0" when inputs are "+1" and "−1", outputs "−1" when inputs are "−1" and "−1", and outputs "+1" when inputs are "+1" and "+1".

Figure 7:
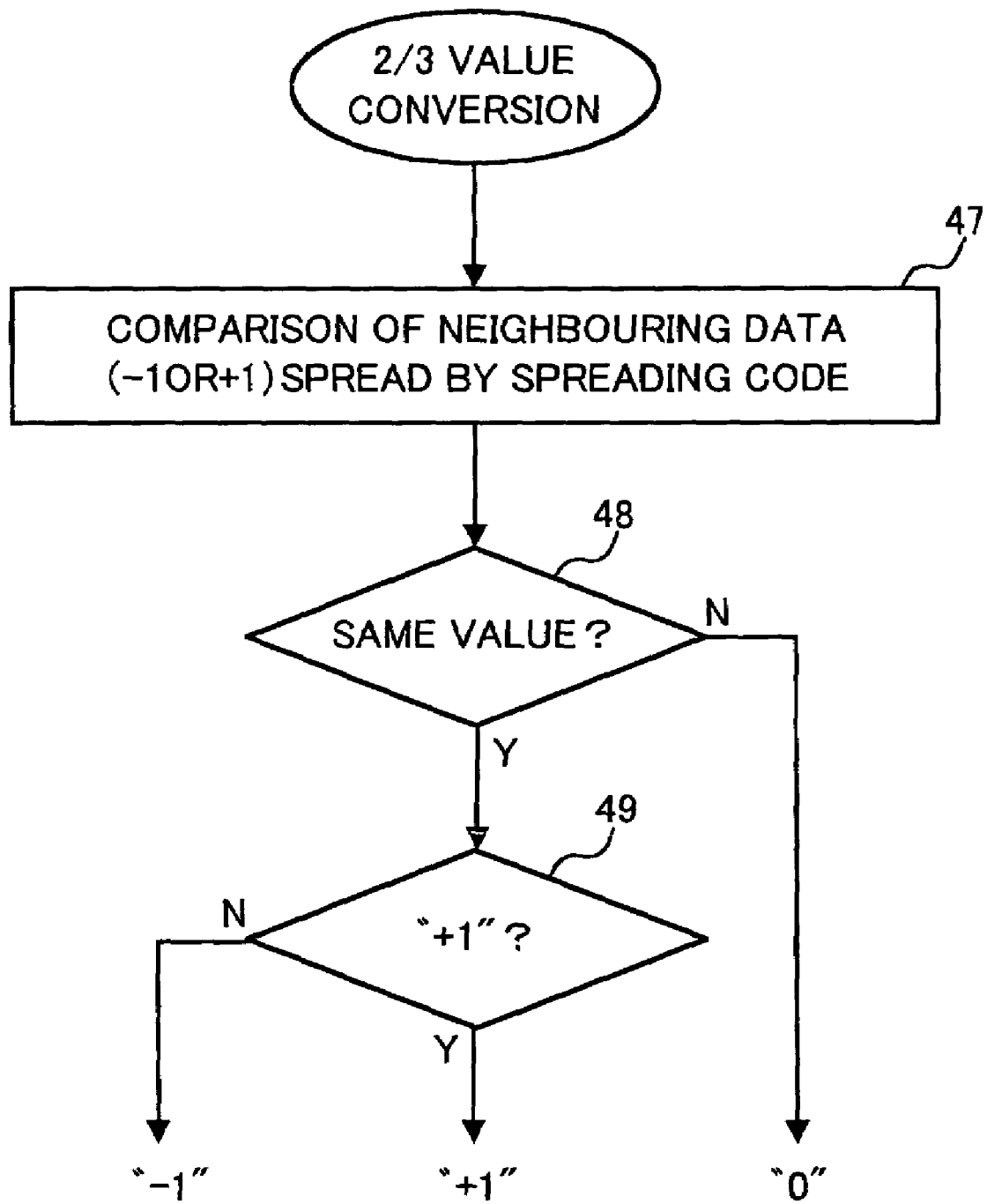
FIG. 7 is a flowchart explaining operations of a ⅔ value converting circuit.

In addition, FIG. 7 is a flowchart illustrating the operation of the aforementioned ⅔ value converting circuits 30 and 31.

Since the correlation value becomes "0" when "0" is outputted, then "0" is outputted compulsory from selector 42 of multiplier 40. On the other hand, when "+1" and "−1" are outputted, it is just multiplied by the reception signal in multiplication circuit 41 and outputted via sector 42.

Accordingly, the addition between neighboring chips and multiplication of reception signal can be simply configured using a simple logic circuit.

For example, because there are only three multiplication values, configuration of fixed number of multipliers similar to conventional configuration of despreading circuit can be used.

Embodiment 2

Figure 8:
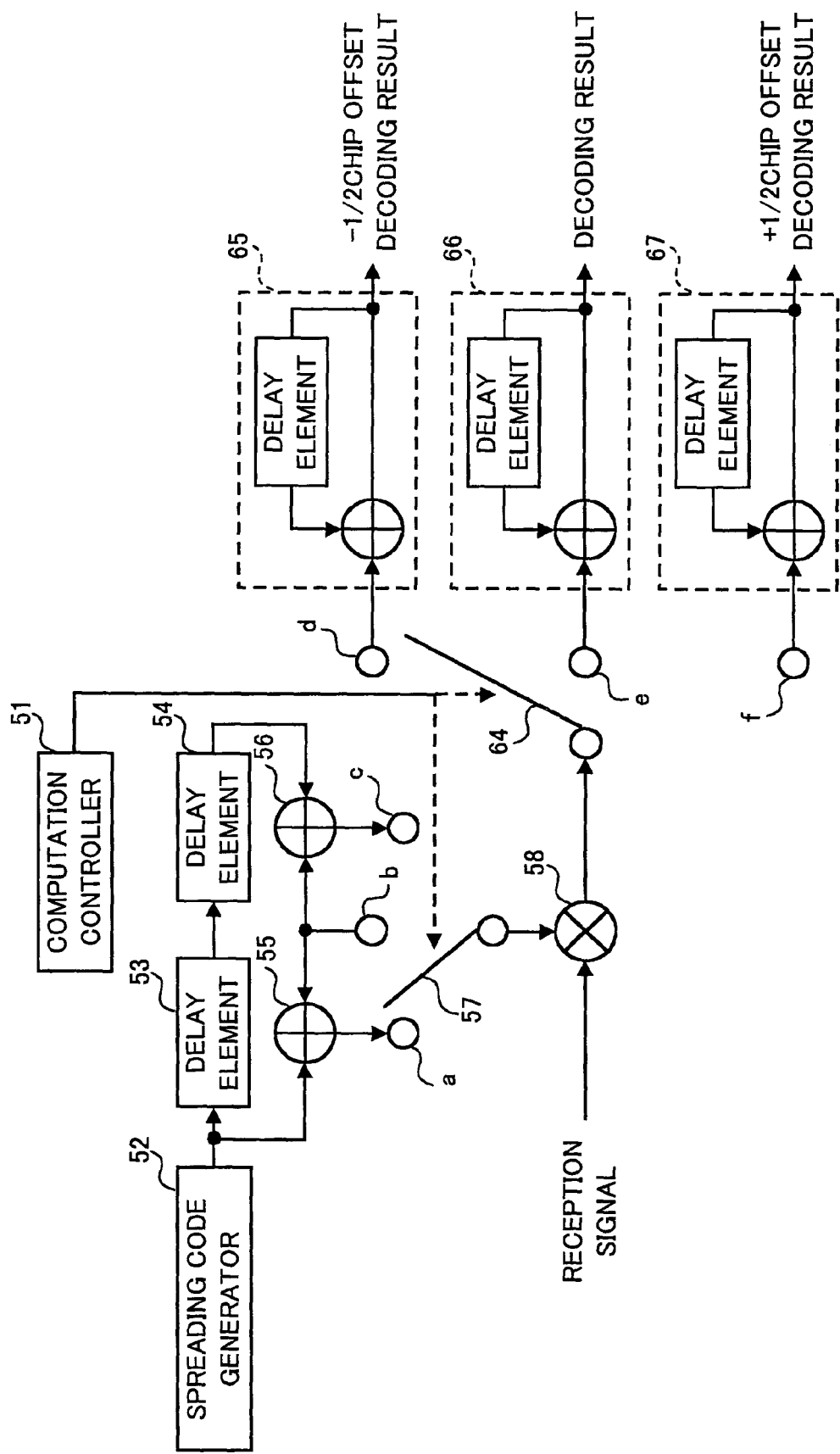
FIG. 8 is a block diagram showing an exemplary configuration of the main part (spreading code generator) of correlation detection apparatus of the present invention.

FIG. 8 is a block diagram showing a configuration of a correlation detection apparatus according to Embodiment 2 of the present invention.

As shown in FIG. 8, such a correlation detection apparatus comprising computation controller 51, code generator 52, delay elements 53 and 54, adders 55 and 56 to add spreading code of timing close to that outputted from delay elements, spreading code switching section 57 to switch spreading codes based on control signal outputted from computation controller, multiplier 58 to perform multiplication with reception signal, multiplication result switching section 64 to switch the data resulted from accumulation of multiplication results for every spreading code, and integrators 65, 66, and 67 to integrate the accumulated symbol data.

In the circuit shown in FIG. 8, the employed spreading code and accumulator are switched to be time multiplexed using switch.

Accordingly, multipliers can be used commonly. Thus, the circuit scale can be reduced. The computation timing control is simple. Furthermore, efficient power consumption saving can be obtained.

Embodiment 3

Figure 9:
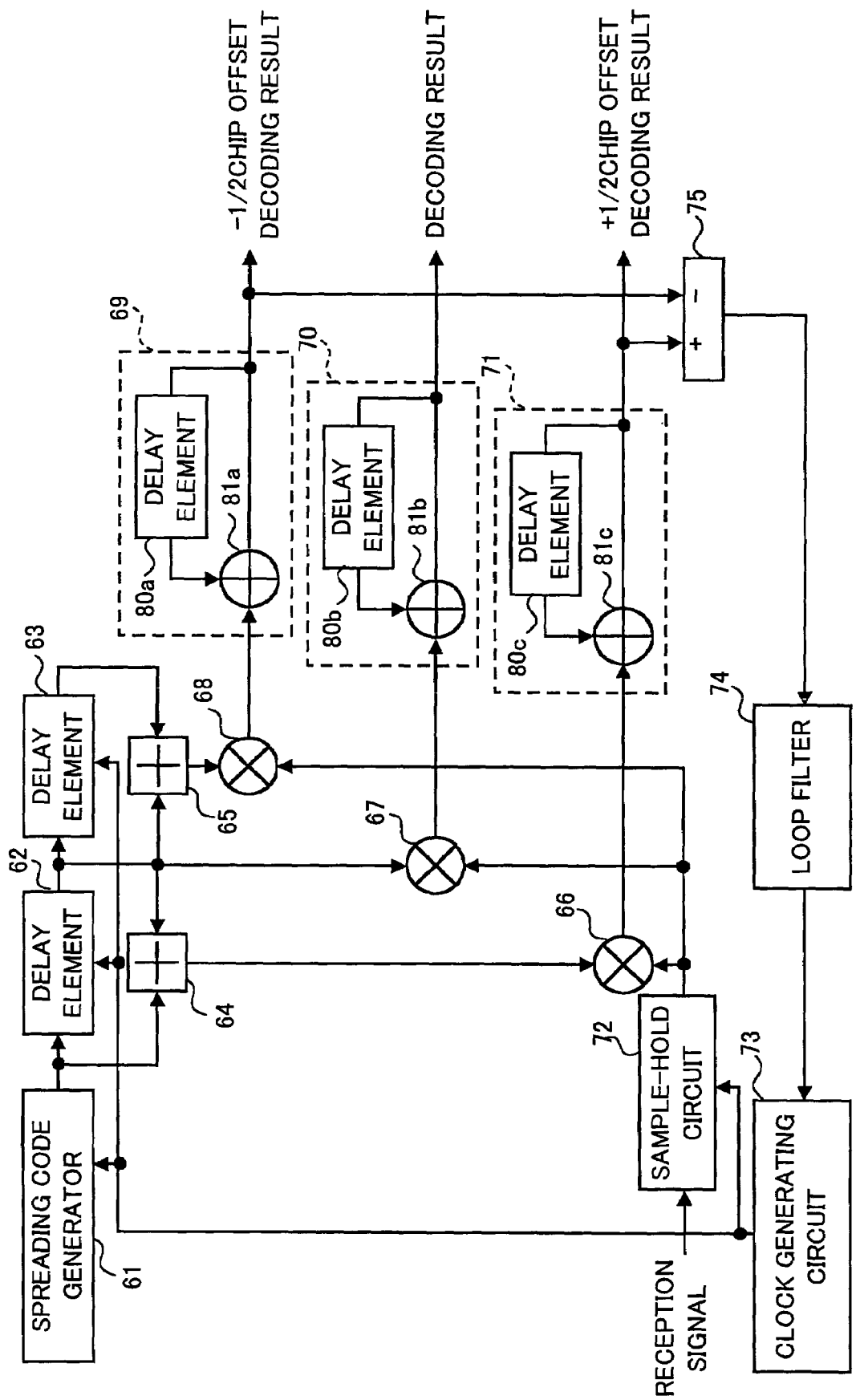
FIG. 9 is a block diagram showing a configuration of a DLL (delay locked loop) using correlation detection circuit of the present invention.

FIG. 9 is a block diagram showing a configuration of a delay locked loop (DLL) according to the present embodiment.

It is an exemplary circuit which practically uses despreading result of a ±½ chip timing from the aforementioned data combination of neighboring chips.

As shown in FIG. 9, the DLL of the present embodiment comprising spreading code generator 61, delay elements 62 and 63, adders 64 and 65 to add spreading code of timing close to that outputted from delay elements, multipliers 66, 67 and 68 to carry out multiplication of reception signal, integrators 69, 70, and 71 to integrate the accumulated symbol data from multiplication result, subtractor 75 to subtract the difference of a ±½ chip despreading value, loop filter 74 to fix the time constant of a delay lock loop, and clock generating circuit 73 to carry out clock generation when generation timing outputted from loop filter is changed due to tracking, etc.

Figure 10A:
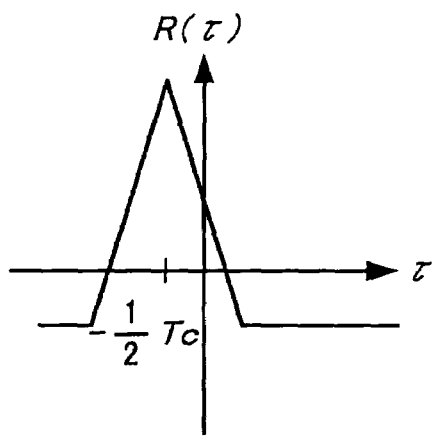
FIG. 10A is a graph illustrating one characteristic of correlation value of DLL.
Figure 10B:
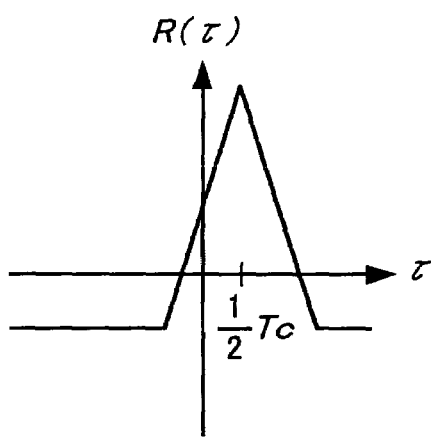
FIG. 10B is a graph illustrating another characteristic of correlation value of DLL.
Figure 10C:
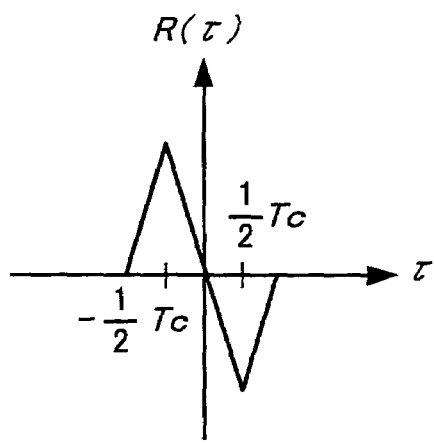
FIG. 10C is a graph illustrating a characteristic of the output of a subtractor of DLL.

Characteristics of the two inputs of subtractor 75 are shown in FIG. 10A and FIG. 10B, respectively. While the output of subtractor 75 has S-shape characteristics as shown in FIG. 10C.

In the present invention, the spreading code is generated by calculation, the timing when sample-hold is performed on the reception signal is one since the reception signal is made constant. Moreover, since a complicated timing control is not necessary, it becomes possible to have low speed operation (chip clock operation), and efficient power consumption saving can be achieved.

Embodiment 4

Figure 11A:
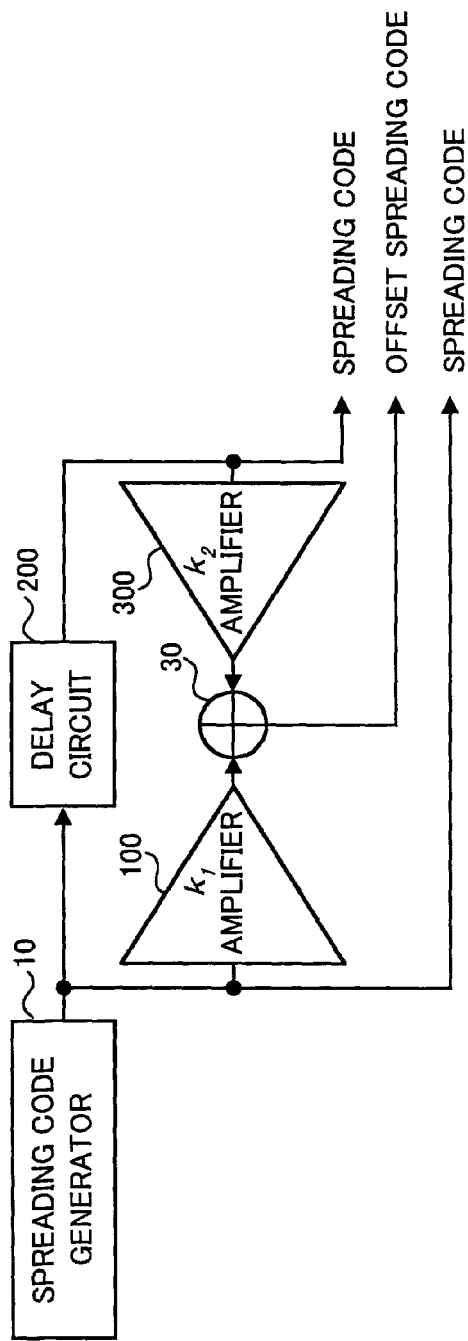
FIG. 11A is a block diagram showing an exemplary configuration of the basic part (spreading code generator) of correlation detection apparatus of the present invention.

Applicable example of the circuit configuration is shown in FIG. 11A.

Such a circuit is similar to the circuit of FIG. 1 added by weighting coefficient circuits (amplifier used for weighting) 100 and 300. It is possible to carry out a highly precise interpolation by freely changing the weighting coefficient.

Figure 11B:
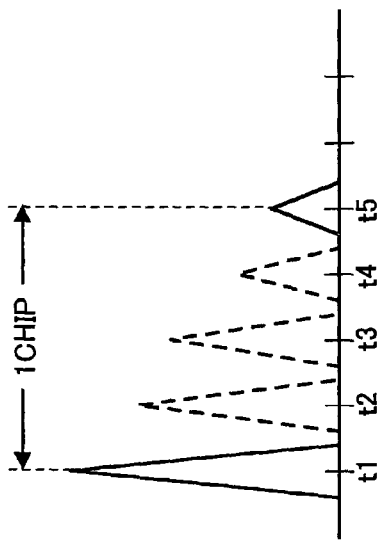
FIG. 11B is a graph explaining a combination of correlation values by changing weighting coefficient.

As shown in FIG. 11B, 1 chip interval is divided into 4 divisions (t1-t5), and spreading codes used for obtaining correlation at each time point can be combined.

However, when analyzing function is erroneously determined in ±½ chip, it is necessary to configure delay circuit 200 to handle large number of bits or the later circuit must be configured to process large number of bits relating to the necessity to process a large number of data bits.

Figure 12:
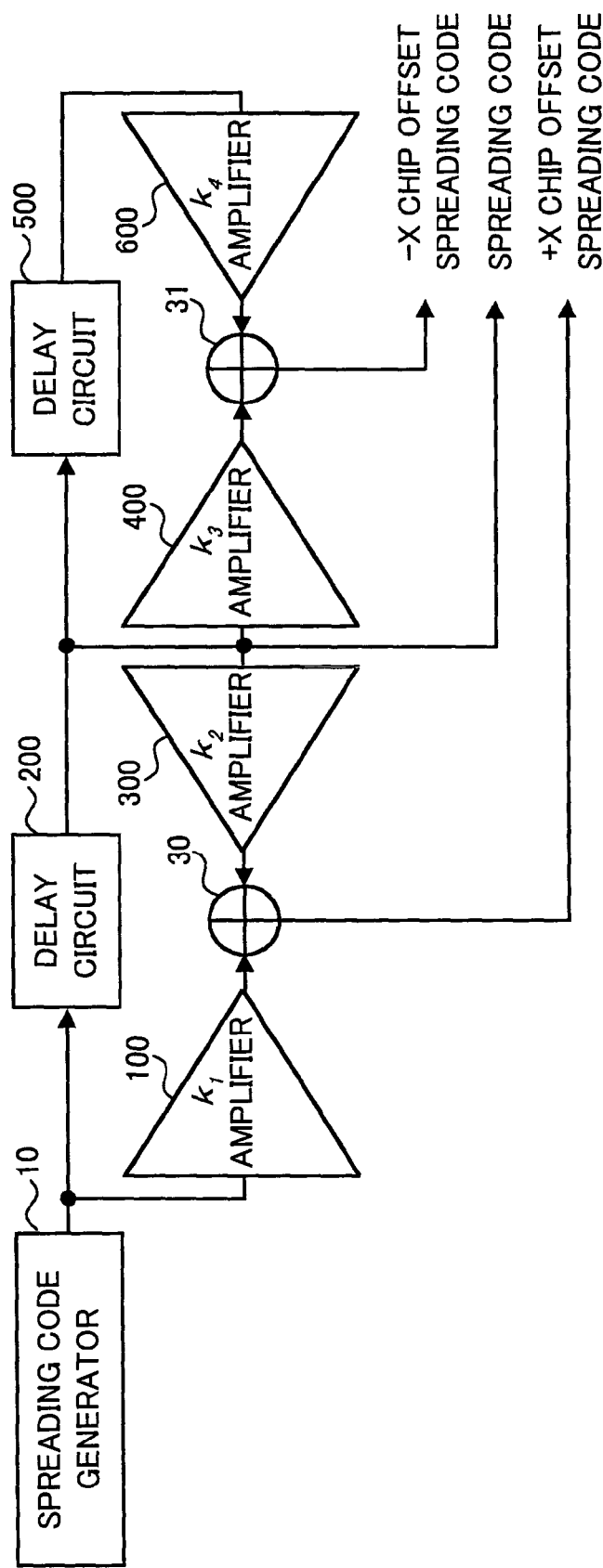
FIG. 12 is a block diagram showing an exemplary configuration of the main part (spreading code generator) of correlation detection apparatus of the present invention.

FIG. 12 is just a modification of FIG. 11A, and it is a circuit built so that to be compatible to FIG. 4, in addition, it is configured so that the offset amount of the code can be adjusted in either positive direction or negative direction.

Embodiment 5

FIG. 13(*a*)-(*c*) are figures to explain the correlation detection method of a W-CDMA synchronization channel (SCH) based on IMT2000 (3G TS 25.211 Version 3.1.1 (1999-12), p. 25).

A synchronization channel (SCH) is a downlink channel showing information whether STTD (Space time block coding based transmit antenna diversity) encoding is carried out in base station side or not.

Moreover, such a synchronization channel (SCH) is used by a mobile terminal for cell search. That is, the reception signal which is subjected to STTD encoding is employed to detect the frame header and slot header.

Figure 15:
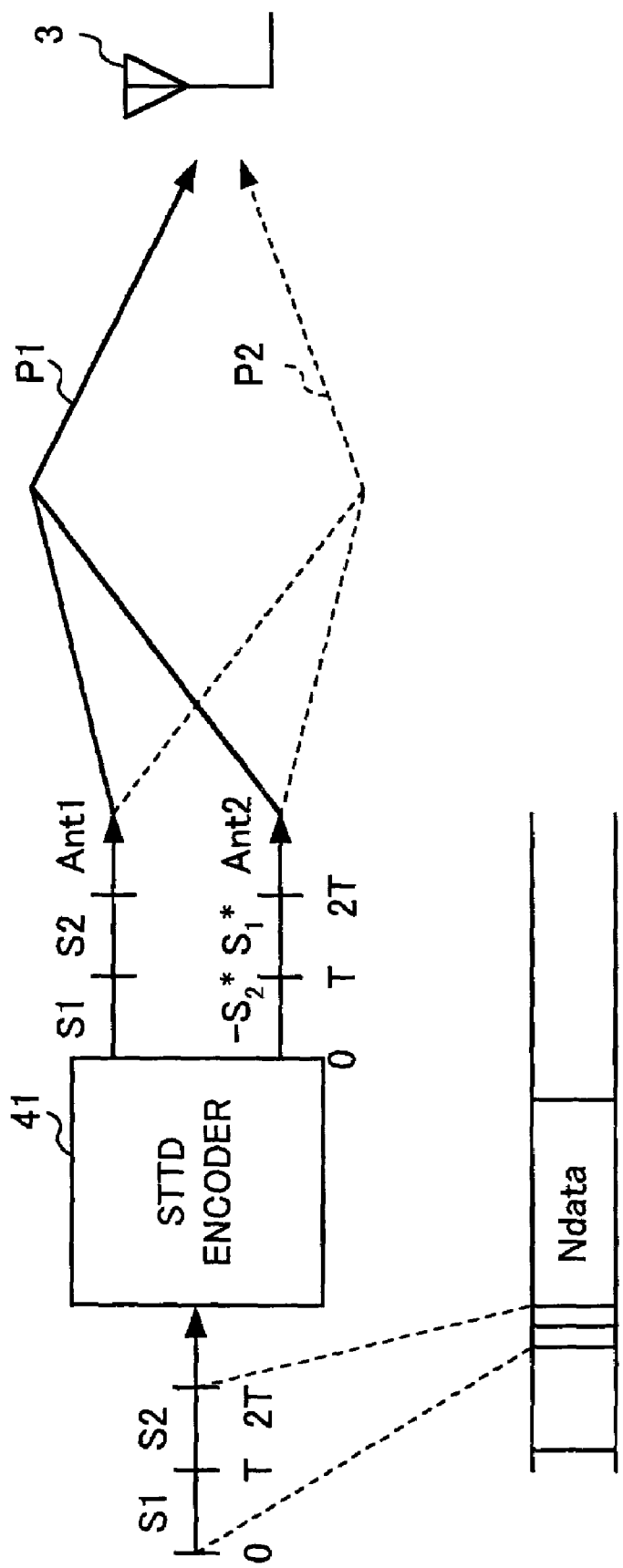
FIG. 15 is a diagram to explain the subject matter of STTD transmission diversity (STTD encoding processing)

The details of STTD transmission diversity is shown in FIG. 15. The STTD encoder 41 of the base station performs STTD encoding processing on the transmission symbols S1 and S2.

The transmission symbols S1 and S2 are just outputted from one antenna (ant1). Whereas S1* and S2* are outputted from the other antenna (ant2). Here, S1* is the complex conjugate of transmission symbol S1, similarly S2* is the complex conjugate of transmission symbol S2.

A reception side apparatus (mobile terminal) receives a multipath signal (P1, P2) by antenna 3. In addition, the reception signal in which STTD encoding processing is carried out is detected, frame header and slot header are also detected using synchronization channel (SCH).

As shown in FIG. 13A, a synchronization channel (SCH) consists of two channels, primary SCH and secondary SCH.

One frame is composed of 15 slots, and the presence of STTD encoding is shown by the value multiplied by a factor (a) inserted in the first synchronization code Cp in the position of slot header in primary SCH.

When the STTD encoding processing is employed in the reception data, the value "a" is assigned "1", while it is assigned "−1" when STTD encoding processing is not employed.

On the other hand, the value multiplied by the factor (a) is inserted into the second synchronization code Cs(i, k) in the secondary SCH (here, i shows number of scrambling code group and k shows the slot number).

When STTD encoding processing is employed in the reception data, the value "a" is assigned "1", while it is assigned "−1" when STTD encoding processing is not employed.

The data is generated by multiplying similar data by different codes respectively, first and second synchronization code (Cp, Cs). In addition, the position of first synchronization code Cp in primary SCH and position of synchronization code Cs in secondary SCH are the same. That is, they are synchronized.

Moreover, since the primary SCH and secondary SCH are transmitted simultaneously from transmission side, and even if they are received under the influence of fading, in the reception side, first and second synchronization code are received at the same time point, and both have the same phase. In addition, since each code is generated based on a common data, the correlation values theoretically are also similar.

In the present embodiment, the objective is considered in such a point. That is, even if the correlation detection is relating to either channel, primary SCH or secondary SCH, the spreading code corresponding to primary SCH (first synchronization Cp) and spreading code corresponding to secondary SCH (second synchronization code Cs) are added and a combined spreading code (aCp+aCs) is generated, then, correlation detection is carried out using such a combined spreading code (aCp+aCs).

Accordingly, the S/N of correlation detection signal is improved. Therefore, it is possible to determine without error the presence of STTD transmission diversity. In addition, it is also possible to perform correctly the cell search.

The configuration of correlation detection circuit according to the present embodiment is shown in FIG. 13B.

Spreading code generator 150 generates a·Cp and spreading code generator 151 generates a·Cs.

Adder 152 adds a·Cp and a·Cs, and outputs the combined spreading code (a·Cp+a·Cs).

Adder 152 carries out the ⅔ value conversion similar to ⅔ value converting circuit (32, 33) of FIG. 5.

The accumulated spreading code (combined synchronization code) is multiplied by reception signal in multiplier 153. Then, correlation value is detected by performing integration in integration circuit 154.

As shown in FIG. 13C, the correlation value ① is obtained by multiplying the first synchronization code, while correlation value ② is obtained by multiplying the second synchronization code. In addition to the remarkable improvement of the S/N of correlation detection due to the addition ①+②(=③), detection sensitivity is also improved.

Figure 14:
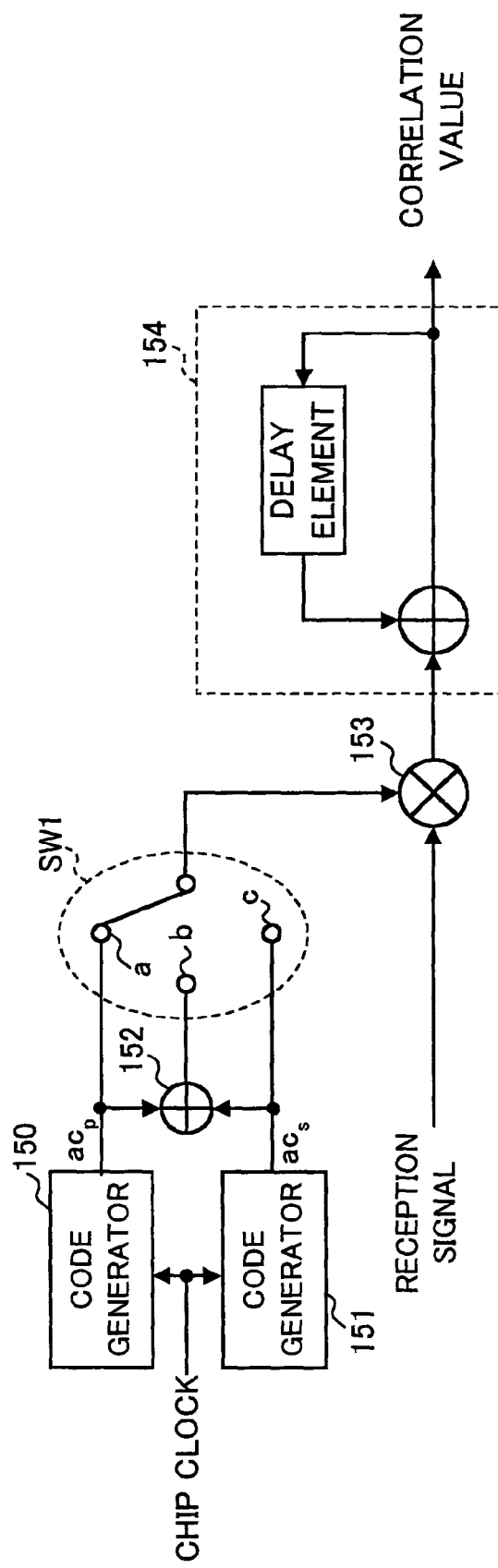
FIG. 14 is a block diagram showing another exemplary configuration of a transmission diversity detection circuit of the present invention.

FIG. 14 is a block diagram showing an exemplary modification of correlation detection circuit.

The circuit of FIG. 14 is characterized by adding a switch SW1 to correlation detection circuit shown in FIG. 13B.

In the circuit of FIG. 14, it is possible to multiply the reception signal by either of aCp, aCs, or (aCp+aCs) selected by switching the switch SW1 (function as selector).

Accordingly, variety of correlation detection processing using synchronization channel is obtained. For example, three correlation values are obtained by switching switch (selector) SW1. In addition, each correlation value is compared mutually, and by using the largest value, it is possible to control the deterioration of correlation detection precision which is caused by fading.

Figure 16:
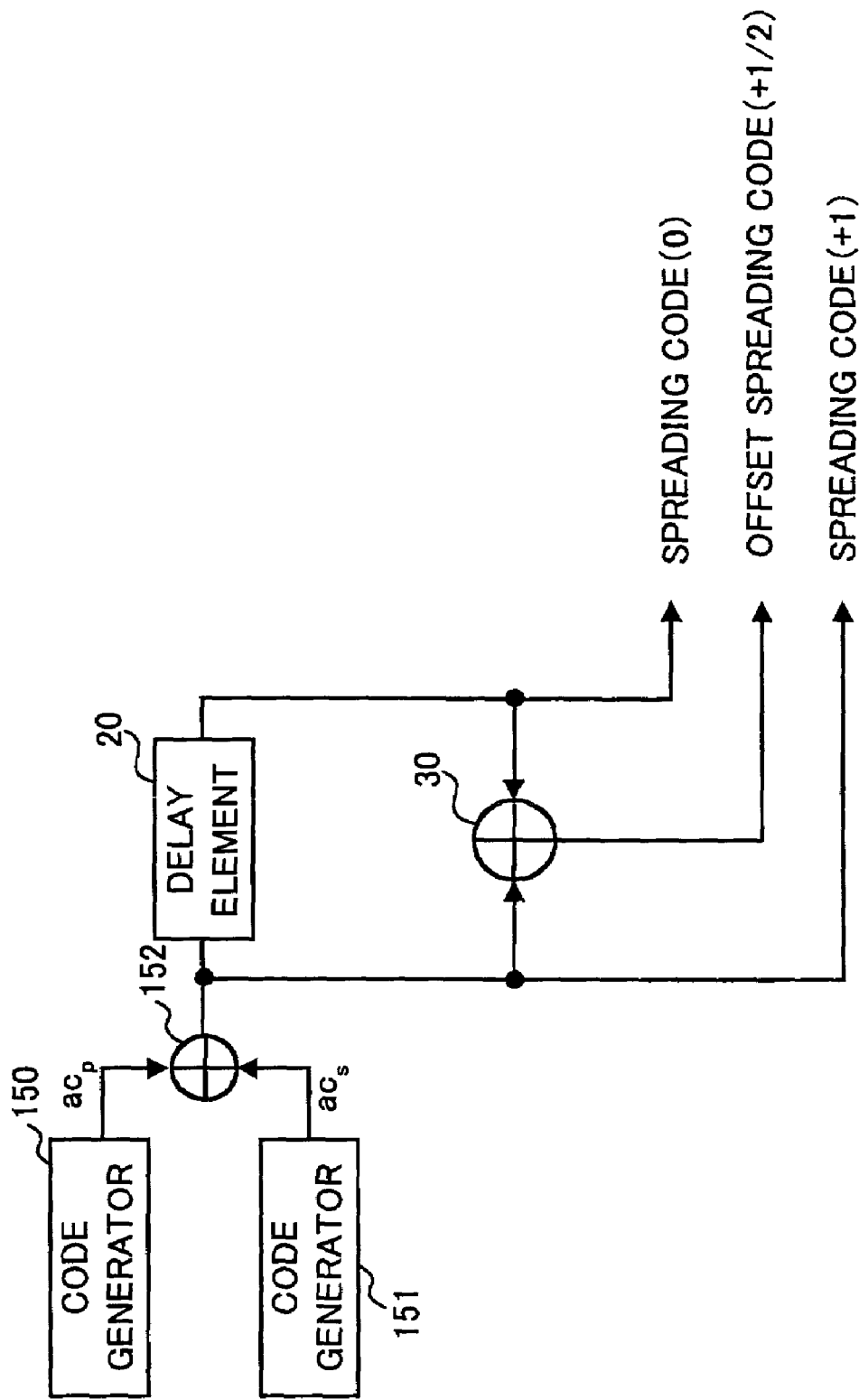
FIG. 16 is a block diagram showing another exemplary configuration of the main part (spreading code generator) of correlation detection apparatus of the present invention.

Moreover, although the correlation detection is carried out per chip clock in the circuit of FIG. 13A, but if considering the circuit configuration shown in FIG. 16, an offset of ±½ chip unit can be obtained in spreading code similar to the previously cited exemplary embodiment (FIG. 1).

Figure 17:
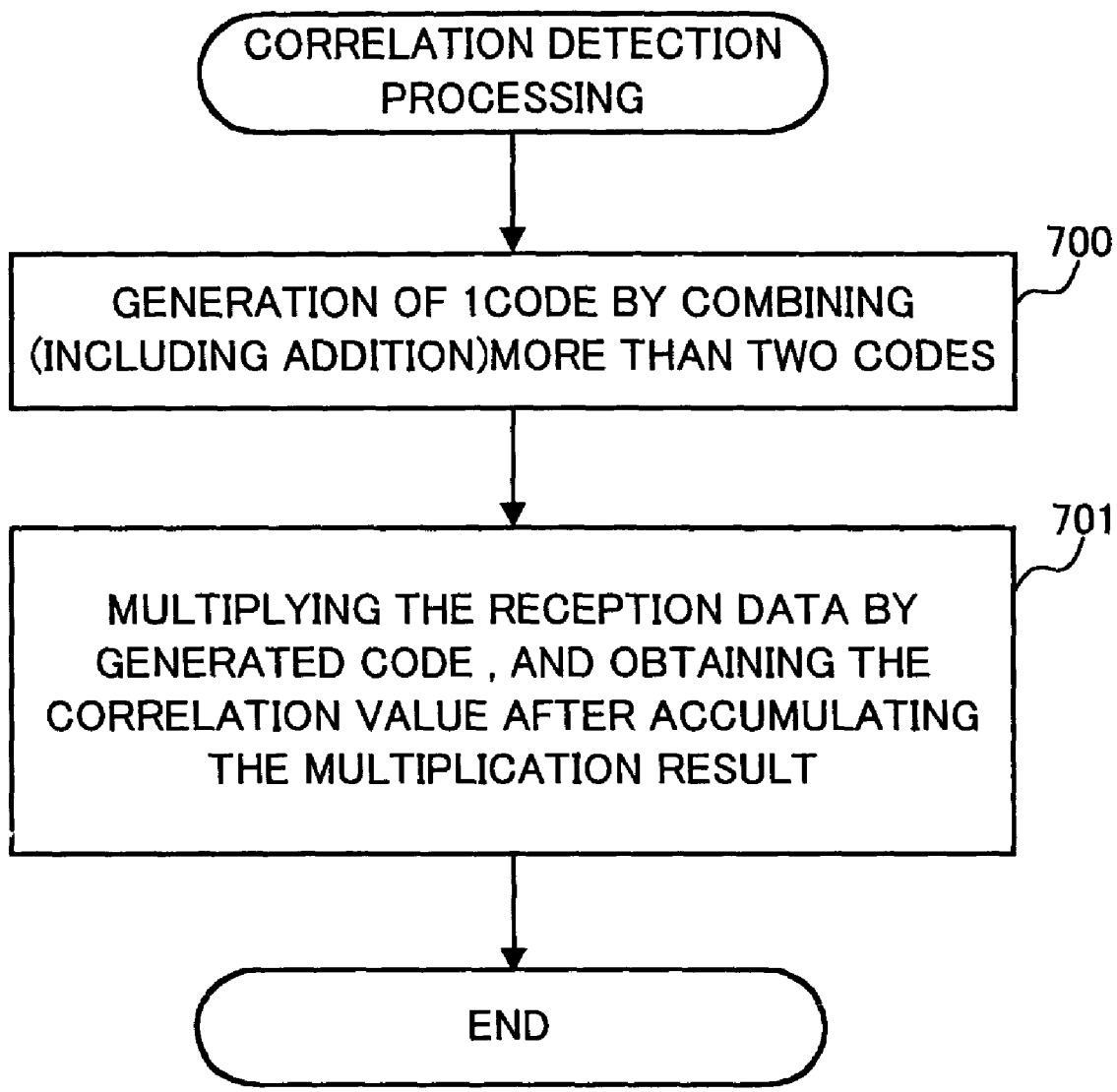
FIG. 17 is a flowchart illustrating basic procedures of correlation detection method of the present invention.

When the basic procedures of correlation detection processing of the aforementioned present invention are compiled, then, they become as shown in FIG. 17.

In other words, one code (combined code) is generated by combining (including linear interpolation or addition process) more than 2 codes (step 700).

Then, generated code is multiplied by the reception data, and the correlation value is detected after accumulating the multiplication results (step 701).

According to the present invention as discussed above, it is possible to generate spreading code, which is not generated only by a conventional chip unit, with a precise timing fraction by chip synchronization.

Moreover, circuit scale reduction by the common use of computation devices, simplification of computation control, and reduction of power consumption can be realized by using correlation detection apparatus of the present invention.

In addition to the aforementioned effects, in correlation detection using synchronization code, the S/N of correlation value can be improved.

This application is based on the Japanese Patent Application No. 2001-107192 filed on Apr. 5, 2001, entire content of which is expressly incorporated by reference herein.

INDUSTRIAL APPLICABILITY

The present invention is applicable to a communication apparatus based on W-CDMA system.

The invention claimed is:

1. A correlation detection apparatus that detects a correlation between a reception signal and a spreading code, comprising:
    a spreading code generator configured to generate a spreading code sequence;
    a delay configured to delay the spreading code sequence by at least one chip interval; and
    a convertor configured to generate a converted spreading code sequence based on the spreading code sequence and the delayed spreading code sequence, wherein the converted spreading code sequence includes an offset unit of one-half chip according to a combination value of chips next to each other in the spreading code sequence,
    wherein the convertor comprises a two-three value convertor configured to generate said converted spreading code sequence of an offset unit of ½ chip by converting the spreading code sequence, which includes two values of "+1" and "−1", into the converted spreading code sequence, which includes three values of "+1", "−1" and "0", wherein the two-three value convertor outputs a "0" when chips next to each other are not similar, outputs a "+1" when chips next to each other are of a value "+1", and outputs a "−1" when chips next to each other are of a value "−1".

2. A correlation detection apparatus according to claim 1 further comprising:
   a correlator configured to generate a plurality of correlation values based on the converted spreading code sequence, the delayed spreading code sequence and a received signal.

3. A correlation detection apparatus according to claim 2, wherein the correlator comprises:
   a multiplier configured to multiply the received signal by the converted spreading code sequence; and
   a selector configured to select one of the multiplied received signal and the converted spreading code sequence based on the combination value of chips next to each other.

* * * * *